United States Patent
Bingrong et al.

(10) Patent No.: US 9,020,242 B2
(45) Date of Patent: Apr. 28, 2015

(54) METHOD AND SYSTEM FOR STEREO CORRESPONDENCE

(71) Applicant: Fujitsu Limited, Kawasaki (JP)

(72) Inventors: Wang Bingrong, Kawasaki (JP); Bai Xianghui, Shanghai (CN); Tan Zhiming, Shanghai (CN)

(73) Assignee: Fujitsu Limited, Kawasaki (JP)

( * ) Notice: Subject to any disclaimer, the term of this patent is extended or adjusted under 35 U.S.C. 154(b) by 146 days.

(21) Appl. No.: 13/800,723

(22) Filed: Mar. 13, 2013

(65) Prior Publication Data

US 2013/0259360 A1 Oct. 3, 2013

(30) Foreign Application Priority Data

Mar. 27, 2012 (CN) .......................... 2012 1 0092651

(51) Int. Cl.
*G06K 9/00* (2006.01)
*G06T 7/00* (2006.01)

(52) U.S. Cl.
CPC .............. *G06T 7/0065* (2013.01); *G06T 7/0075* (2013.01); *G06T 2207/10012* (2013.01)

(58) Field of Classification Search
USPC ......... 348/42, 51, E15.001, E13.001, E13.02, 348/E13.026; 382/154
See application file for complete search history.

(56) References Cited

PUBLICATIONS

Li-Li Cai-Ming Zhang, "Local Stereo Matching with Edge-Based Cost Aggregation and Occlusion Handling", Image and Signal Processing, 2009, CISP'09, 2nd International Congress, Tianjin, China, Oct. 17-19, 2009, IEEE, pp. 1-4.*
Xing Mei et al., "On Building an Accurate Stereo Matching System on Graphics Hardware", 2011, IEEE International Conference on Computer Vision Workshops, Barcelona, Spain, Nov. 6-13, 2011, pp. 467-474.*
Extended European Search Report issued Oct. 1, 2013 in corresponding European Application No. 13161178.2.
European Notification of Publication Number and Information on the Application issued Oct. 2, 2013 in corresponding European Application No. 13161178.2.
Li-Li Cai-Ming Zhang, "Local Stereo Matching with Edge-Based Cost Aggregation and Occlusion Handling", Image and Signal Processing, 2009, CISP'09, $2^{nd}$ International Congress, Tianjin, China, Oct. 17-19, 2009, IEEE, pp. 1-4.
Andreas Klaus et al., "Segment-Based Stereo Matching Using Belief Propagation and a Self-Adapting Dissimilarity Measure[1]", The $18^{th}$ International Conference on Pattern Recognition (ICPR'06), 2006, IEEE, pp. 1-4.
Qingxiong Yang et al., "Stereo Matching with Color-Weighted Correlation, Hierarchical Belief Propagation, and Occlusion Handling", IEEE Transactions on Pattern Analysis and Machine Intelligence, vol. 31, No. 3, Mar. 2009, pp. 492-504.

* cited by examiner

*Primary Examiner* — Gregory F Cunningham
(74) *Attorney, Agent, or Firm* — Staas & Halsey LLP

(57) ABSTRACT

A method and system for stereo correspondence. The method for stereo correspondence includes a matching cost computation step, a cost aggregation step, a disparity computation step, and a disparity optimization step. The matching cost computation step acquires a left disparity space image and a right disparity space image by using horizontal gradients and vertical gradients of intensities of all component channels of every pixel in a left image and a right image. Utilizing the invention, accurate disparity maps may be acquired quickly.

8 Claims, 5 Drawing Sheets

METHOD AND SYSTEM FOR STEREO CORRESPONDENCE

CROSS-REFERENCE TO RELATED APPLICATIONS

This application is based upon and claims the benefit of foreign priority of Chinese Patent Application No. 201210092651.9, filed Mar. 27, 2012, the entire contents of which are incorporated herein by reference.

FIELD OF THE INVENTION

The invention relates to image processing, and in particular to a method and system for stereo correspondence.

BACKGROUND

Stereo correspondence is a process that captures two or more images of a certain scene, estimates a three-dimensional (3D) model of the scene through finding out matching pixels between the images precisely, and converts two-dimensional (2D) positions of the matching pixels between the images into 3D depths. In a simple imaging configuration (e.g., an imaging configuration of two eyes or two cameras looking straight forward), a disparity between the two eyes or the two cameras is in inverse proportion to a distance between the two eyes or the two cameras and an observed object (i.e., a stereo depth of the observed object in the captured image). Therefore, a disparity map is usually used to describe stereo depths of pixels in a captured image.

In traditional stereo correspondence algorithms, it is usually to take one of the two images captured by two eyes or two cameras as a reference image and another image as an object image, and output a disparity map of the object image with respect to the reference image.

Although there are lots of algorithms for stereo correspondence, they usually comprise the following steps: a matching cost computation step, a cost aggregation step, a disparity computation step, and a disparity optimization step, wherein:

The matching cost computation step computes pixel value differences, between the reference image and the object image, corresponding to every disparity value between a minimum disparity value ($d_{min}$) and a maximum disparity value ($d_{max}$). All the disparity values between "$d_{min}$" and "$d_{max}$" and all the pixel value differences corresponding to the disparity values form an initial disparity space image (DSI). Traditional matching cost computation methods comprise: (1) a method for computing squares of intensity differences (SDs) and a method for computing absolute values of light intensity differences (ADs) (the two methods are both sensitive to noises); and (2) non-parametric methods such as ranking transformation and statistics transformation (these methods are not very sensitive to noises, but their computation time is long).

The cost aggregation step acquires a more reliable matching cost through summing matching costs in support windows on matching cost planes corresponding to every disparity value together. The most commonly-used cost aggregation method is to sum matching costs in a fixed window on a matching cost plane together. However, this method has defects in many aspects, because that: (1) it ignores discontinuity of stereo depths of pixels in an image; and (2) it does not process blurring regions in the image. Therefore, an ideal cost aggregation method should use a support window comprising as more as possible points corresponding a same disparity value on a matching cost plane. For this, support windows such as a movable window, a multiple-window and a variable window are provided. However, all of these windows fail to obtain a satisfactory result, and their efficiencies are not high.

The disparity computation step acquires a disparity map of an image based on the initial DSI. Generally, for a pixel on an image captured with respect to a scene, a disparity value corresponding to a minimum matching cost aggregation value associated with the pixel is selected as the disparity value of the pixel.

The disparity optimization step performs post-process on the acquired disparity value, and further comprises a sub-pixel optimization sub-step, an occlusion detection sub-step and an occlusion filling sub-step. Traditional occlusion filling methods comprise: (1) selecting a minimum disparity value of an un-occluded pixel that is closest-in-space to an occluded pixel in a same pixel line as the disparity value of the occluded pixel (the method would produce stripe-like artifacts); and (2) smoothing occluded regions by a bilateral filter (the processing speed of the method is comparative slow).

SUMMARY OF THE INVENTION

In view of the problems stated above, the invention provides a novel method and system for stereo correspondence.

A method for stereo correspondence in accordance with an embodiment of the invention comprises a matching cost computation step, a cost aggregation step, a disparity computation step, and a disparity optimization step, wherein the matching cost computation step computes a left disparity space image taking a left image as a reference image and a right disparity space image taking a right image as the reference image by using horizontal gradients and vertical gradients of intensities of all component channels of every pixel in the left image and the right image.

A system for stereo correspondence in accordance with an embodiment of the invention comprises a matching cost computation unit, a cost aggregation unit, a disparity computation unit, and a disparity optimization unit, wherein the matching cost computation unit is used to compute a left disparity space image taking a left image as a reference image and a right disparity space image taking a right image as the reference image by using horizontal gradients and vertical gradients of intensities of all component channels of every pixel in the left image and the right image.

The invention can quickly acquire an accurate disparity map.

DESCRIPTION OF THE DRAWINGS

The invention can be better understood from the following description in conjunction with the accompanying drawings, wherein.

DETAILED EMBODIMENTS

Next, characteristics and exemplary embodiments of various aspects of the invention will be described in detail. The following description covers many specific details so as to provide comprehensive understanding of the invention. However, it would be obvious for those skilled in the art that the invention may be implemented in absence of some of the specific details. The following descriptions of embodiments are merely for providing clearer understanding of the invention through illustrating examples of the invention. The invention is not limited to any specific configuration and algorithm provided below, and instead covers any modification, substitution, and improvement of corresponding elements, components and algorithms without departing from the spirit of the invention.

As traditional stereo correspondence algorithms do, the method for stereo correspondence proposed by the invention also comprises the following four steps: a matching cost computation step, a cost aggregation step, a disparity computation step, and a disparity optimization step.

Figure 1:
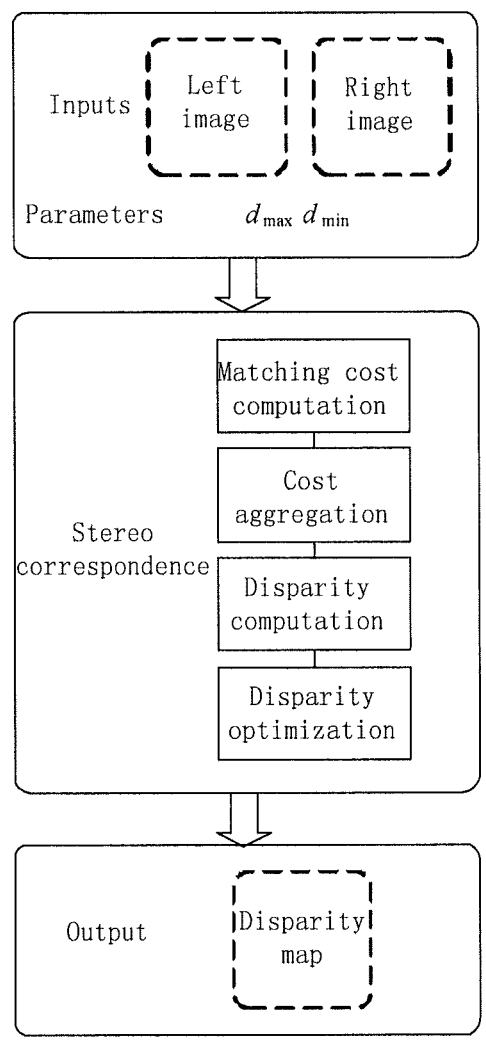
FIG. 1 illustrates a schematic diagram of a method/system for stereo correspondence in accordance with an embodiment of the invention.

FIG. 1 illustrates a schematic diagram of a method/system for stereo correspondence in accordance with an embodiment of the invention. Specifically, in the method/system for stereo correspondence in accordance with an embodiment of the invention, a matching cost computation method that can balance sensitiveness to noises and computation complexity better and a cost aggregation method based on an edge-aware support window are employed. Furthermore, in the disparity optimization step/unit in accordance with an embodiment of the invention, sub-pixel optimization is implemented by quadratic polynomial interpolation, occlusion detection is implemented by cross checking, and occlusion filling is implemented by using an edge-aware median filter.

The method/system for stereo correspondence in accordance with an embodiment of the invention generates a disparity map from a pair of rectified images. In standard rectified geometry, a disparity is a difference of "x" coordinates of two corresponding pixels in a pair of rectified images. However, as the disparity is in inverse proportion to a pixel depth (abbreviated to "depth" hereinafter), the disparity is usually used to represent the pixel depth. Every pixel has its own depth, so the disparity map will form an image $d(x,y)$.

Specifically, the method/system for stereo correspondence in accordance with an embodiment of the invention takes a left image, a right image, a predetermined minimum disparity value "$d_{min}$" and a predetermined maximum disparity value "$d_{max}$" as inputs, and outputs a disparity map of the left image. Next, descriptions will be made by taking acquiring the disparity map of the left image as an example. However, those skilled in the art will understand that a disparity map of the right image can be acquired in a similar way. It should be noted that the minimum disparity value and the maximum disparity value referred here represent a predetermined scope of disparity values that can be handled by the method for stereo correspondence in accordance with an embodiment of the invention.

Next, each step of the method for stereo correspondence executed by the system for stereo correspondence in accordance with an embodiment of the invention will be described in detail with reference to the accompany drawings.

Matching Cost Computation

Figure 2:
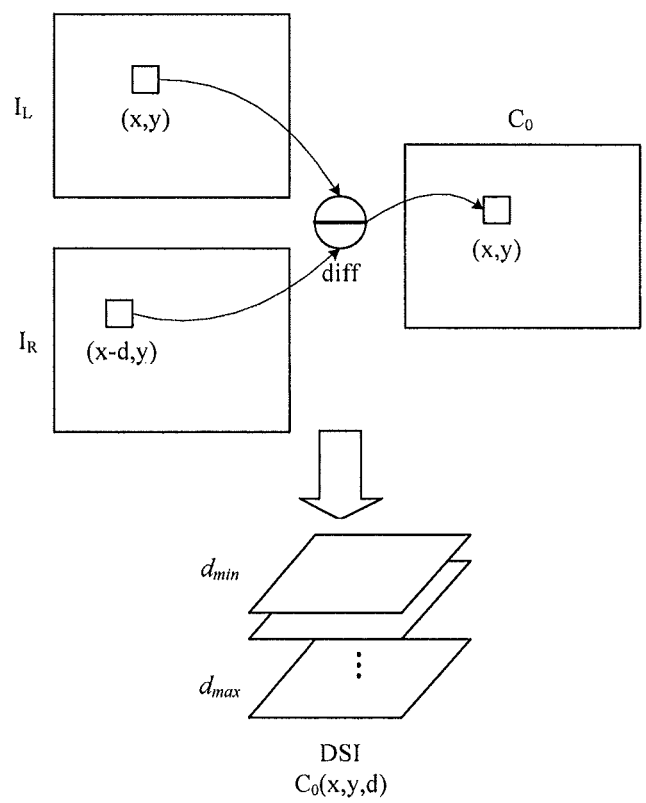
FIG. 2 illustrates a schematic diagram of a matching cost computation step executed by a matching cost computation unit.

The step is used for computing a matching cost between two pixels so as to find out a corresponding relationship between the two pixels. FIG. 2 illustrates a schematic diagram of a matching cost computation step in accordance with an embodiment of the invention. As illustrated in FIG. 2, for a left image $I_L(x,y)$ and any disparity value "d" between the minimum disparity value "$d_{min}$" and the maximum disparity value "$d_{max}$", a matching cost $C_0(x,y,d)$ is computed as follow:

when $x - d \geq 1$, $$C_0(x, y, d) = (1 - \alpha_1 - \alpha_2)\min\left(\frac{\sum_{i=1}^{c} |I_L^i(x, y)I_R^i(x-d, y)|}{c}, \tau\right) +$$
$$\alpha_1\min(|\nabla_x I_L(x, y) - \nabla_x I_R(x-d, y)|, \tau_1) +$$
$$\alpha_2\min(|\nabla_y I_L(x, y) - \nabla_y I_R(x-d, y)|, \tau_2)$$

when $x \leq d$, $$C_0(x, y, d) = (1 - \alpha_1 - \alpha_2)\min\left(\frac{\sum_{i=1}^{c} |I_L^i(x, y)|}{c}, \tau\right) +$$
$$\alpha_1\min(|\nabla_x I_L(x, y)|, \tau_1) + \alpha_2\min(|\nabla_y I_L(x, y)|, \tau_2)$$

In the above equations, $I_L^i(x,y)$ represents an intensity value of "i" channel of a pixel (x,y) in the left image; $I_R^i(x-d,y)$ represents an intensity value of "i" channel of a pixel (x-d,y) in the right image; $\nabla_x I_L(x,y)$ represents a horizontal gradient at the pixel (x,y) of a grayscale image converted from the left image, $\nabla_x I_R(x-d,y)$ represents a horizontal gradient at the pixel (x-d,y) of a grayscale image converted from the right image, $\nabla_y I_L(x, y)$ represents a vertical gradient at the pixel (x,y) of a grayscale image converted from the left image, $\nabla_y I_R(x-d,y)$ represents a vertical gradient at the pixel (x-d,y) of a grayscale image converted from the right image, and "c" represents the number of channels (for an RGB image, c=3; and for a grayscale image, c=1). Additionally, parameters in the above equations are set as follows:

$\alpha_1=0.75$;

$\alpha_2=0.14$;

$\tau=9/255$;

$\tau_1=2/255$;

$\tau_2=2/255$;

For a right image $I_R(x,y)$, a matching cost $C'_0(x,y,d)$ is simply computed as follows:

when $x + d \leq w$, $C'_0(x, y, d) = C_0(x+d, y, d)$ when $x + d > w$, $$C'_0(x, y, d) = (1 - \alpha_1 - \alpha_2)\min\left(\frac{\sum_{i=1}^{c} |I_R^i(x, y)|}{c}, \tau\right) +$$
$$\alpha_1\min(|\nabla_x I_R(x, y)|, \tau_1) + \alpha_2\min(|\nabla_y I_R(x, y)|, \tau_2)$$

The above computed matching costs will form two disparity space images (DSIs) with a size of $h*w*(d_{max}-d_{min}+1)$, wherein "h" represents heights of the left image and the right image, and "w" represents widths of the left image and the right image.

Cost Aggregation Step

The step is used for aggregating matching costs by summing or averaging matching costs on a support window in a DSI. For each disparity value "d", two-pass 1D cost aggregation is implemented along a horizontal direction and a vertical direction respectively to $C_0(x,y,d)$ and $C'_0(x,y,d)$.

Next, descriptions will be made taking the left disparity space image (DSI) as an example. For a matching cost plane corresponding to a disparity value "d" in the left disparity space image (DSI), cost aggregation in the horizontal pass is implemented firstly, and then cost aggregation in the vertical pass is implemented to the result of the horizontal pass. Firstly, processing procedure of the horizontal pass will be described. For a pixel (x,y) in the matching cost plane corresponding to the disparity value "d" in the left disparity space image (DSI), its aggregation cost is an average value of all the matching costs in a support window (i.e., a cost aggregation support window):

$$C_1(x, y, d) = \frac{\sum_{u=x_1}^{x_2} C_0(u, y, d)}{x_2 - x_1 + 1}$$

Wherein "$x_1$" is the "x" coordinate of a left boundary pixel of the support window, and "$x_2$" is the "x" coordinate of a right boundary pixel of the support window. An ideal support window should include as many as possible points at the same depth in the matching cost plane corresponding to the disparity value "d". The depth changes at boundaries of the support window. The method for stereo correspondence in accordance with an embodiment of the invention detects boundaries through gradient accumulation. Pixels that are located surrounding the pixel (x,y) in the matching cost plane corresponding to the disparity value "d" and having a "x" coordinate between "x" coordinates of the aforementioned boundary pixels will be included in the support window.

Figure 3:
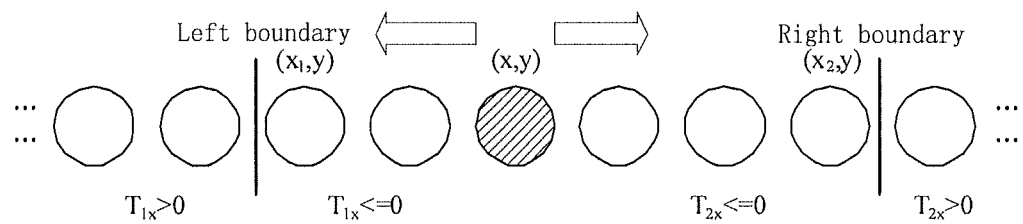
FIG. 3 illustrates a process of determining a left boundary pixel "$x_1$" and a right boundary pixel "$x_2$"

FIG. 3 illustrates a process of determining the "x" coordinate "$x_1$" of the left boundary pixel and the "x" coordinate "$x_2$" of the right boundary pixel. Firstly, for the "x" coordinate "$x_1$" of the left boundary pixel, the following function is defined to determine whether or not a pixel (u,y) has a same depth as the pixel (x,y) does. If $T_{1x}(u,y) \le 0$, the pixel (u,y) is considered to have the same depth as the pixel (x,y) does, otherwise they are not considered to have the same depth.

$$T_{1x}(u, y) = (x - u) + \alpha \sum_{j=u+1}^{x} \sum_{i=1}^{c} |\nabla_x I^i(j, y)| - \beta$$

Wherein $\nabla_x I^i(j, y)$ represents a horizontal gradient of "i" channel at a pixel (j,y) in the left image. Parameters "$\alpha$" and "$\beta$" control sensitiveness of the method for stereo correspondence in accordance with an embodiment of the invention to boundaries of the support window. Here, values of "$\alpha$" and "$\beta$" are set as follows:

$$\alpha = \frac{10}{3}(d_{max} - d_{min});$$
$$\beta = \sqrt{3}\,(d_{max} - d_{min}).$$

For the right boundary pixel, the following function is defined similarly. If $T_{2x}(u,y) \le 0$, then the pixel (u,y) is considered to have a same depth as the pixel (x,y) does, otherwise they are not considered to have the same depth.

$$T_{2x}(u, y) = (u - x) + \alpha \sum_{j=x+1}^{x} \sum_{i=1}^{c} |\nabla_x I^i(j, y)| - \beta$$

In order to make the support window include as more as possible points at the same depth, let:

$x_1 = \min\{u | 1 \le u < x \text{ and } T_{1x}(u,y) \le 0\};$ $x_2 = \max\{u | x < u \le w \text{ and } T_{2x}(u,y) \le 0\};$ In such a way, a support window in "x" direction for the pixel (x,y) in the matching cost plane corresponding to the disparity value "d" is acquired. Matching costs in the support window are averaged so as to acquire an aggregation cost $C_1(x,y,d)$. For the right disparity space image, the same method can be used to acquire a support window and to compute an aggregation cost $C'_1(x,y,d)$.

Actually, recursion formulas can also be used to acquire $T_{1x}$ and $T_{2x}$:

$$T_{1x}(u, y) = \begin{cases} 1 + \alpha \sum_{i=1}^{c} |\nabla_x I^i(u+1, y)| + T_{1x}(u+1, y), & 1 \le u < x \\ -\beta, & u = x; \end{cases}$$

$$T_{2x}(u, y) = \begin{cases} 1 + \alpha \sum_{i=1}^{c} |\nabla_x I^i(u, y)| + T_{2x}(u-1, y), & x < u \le w \\ -\beta, & u = x. \end{cases}$$

Now, process of the vertical pass will be described. Specifically, the process of the vertical pass is applied to the result of the horizontal pass:

$$C(x, y, d) = \frac{\sum_{y_i=y_1}^{y_2} C_1(x, y_i, d)}{y_2 - y_1 + 1}$$

Wherein:

$y_1 = \min\{v \mid 1 \le v < y \text{ and } T_{1y}(x, v) \le 0\};$ $y_2 = \max\{v \mid y < v \le h \text{ and } T_{2y}(x, v) \le 0\}.$ $$T_{1y}(x, v) = (y - v) + \alpha \sum_{j=v+1}^{y} \sum_{i=1}^{c} |\nabla_y I^i(x, j)| - \beta;$$

$$T_{2y}(x, v) = (v - y) + \alpha \sum_{j=y+1}^{v} \sum_{i=1}^{c} |\nabla_y I^i(x, j)| - \beta.$$

It should be noted that based on $T_{1y}(x,v) \le 0$ and $T_{2y}(x,v) \le 0$, we also determine that the pixel (x,v) has the same depth as the pixel (x,y) does and the window is of a size of including all points meeting the condition.

The same computation is implemented in the right disparity space image (DSI) so as to acquire $C'(x,y,d)$. After the aforementioned step is implemented by traversing all disparity values "d" including the minimum disparity value, the maximum disparity value and all the disparity values between them, the method for stereo correspondence in accordance with an embodiment of the invention proceeds to the next step which computes a disparity from DSI and optimizes the disparity.

Disparity Computation and Optimization

Figure 4:
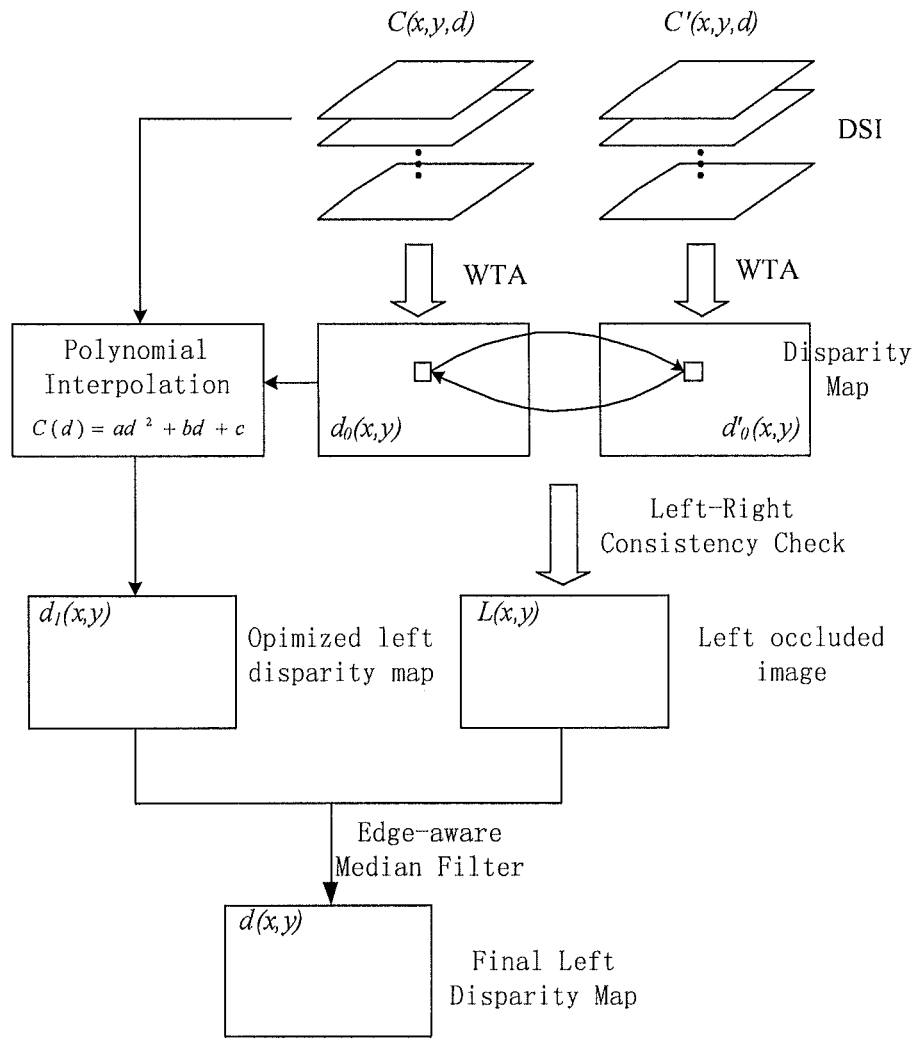
FIG. 4 illustrates a process of a disparity computation and optimization step executed by a disparity computation unit and a disparity optimization unit.

FIG. 4 illustrates a process of disparity computation and optimization. The method for stereo correspondence in accordance with an embodiment of the invention simply selects a disparity value corresponding to a minimum aggregation cost at each pixel as the disparity value of the pixel (which is called a winner-takes-all (WTA) method).

$$d_0(x, y) = \underset{d}{\operatorname{argmin}}(C(x, y, d));$$

$$d'_0(x, y) = \underset{d}{\operatorname{argmin}}(C'(x, y, d)).$$

Wherein $d_0$ (x,y) represents an initial disparity value of the pixel (x,y) in the left image, and $d'_0$ (x,y) represents an initial disparity value of the pixel (x,y) in the right image.

Then, the method for stereo correspondence in accordance with an embodiment of the invention applies sub-pixel optimization to reduce the discontinuity of disparity value resulted from the discrete cost function. The method for stereo correspondence in accordance with an embodiment of the invention estimates a middle disparity value of the pixel (x,y) by using matching costs corresponding to the initial disparity value $d_0$ and its two adjacent disparity values ($d_0-1$) and ($d_0+1$) at the pixel (x,y) through quadratic polynomial interpolation, wherein "$d_0$" is the disparity value having the minimum matching cost, and the other two disparity values are disparity values adjacent to "$d_0$".

Figure 5:
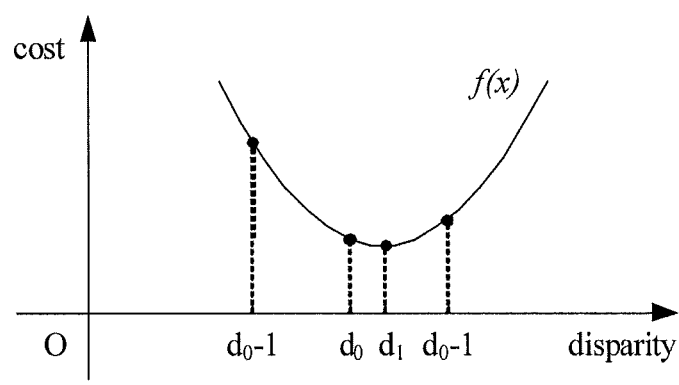
FIG. 5 illustrates a graph of a quadratic polynomial.

FIG. 5 illustrates a graph of the quadratic polynomial:

$$f(x)=ax^2+bx+c$$

A parabola represented by the above quadratic polynomial can be uniquely determined by three points, and f(x) will have a minimum value when $$x = \frac{-b}{2a}.$$

Given $d_0$, $f(d_0)$, $f(d_0-1)$ and $f(d_0+1)$ (wherein $f(d_0)$, $f(d_0-1)$ and $f(d_0+1)$ are matching costs respectively corresponding to the disparity values $d_0$, ($d_0-1$) and ($d_0+1$)), parameters "a" and "b" can be computed as follows:

$$a = \frac{f(d_0+1) + f(d_0-1) - 2f(d_0)}{2}$$

$$b = -d_0(f(d_0+1) + f(d_0-1) - 2f(d_0)) + \frac{f(d_0+1) - f(d_0-1)}{2}$$

Therefore, the optimized disparity value is:

$$d_1 = \frac{-b}{2a} = d_0 - \frac{f(d_0+1) - f(d_0-1)}{2(f(d_0+1) + f(d_0-1) - 2f(d_0))}$$

In another aspect, a discrete left disparity map and a discrete right disparity map are used to perform cross checking for occlusion detection. That is, if the middle disparity value at the pixel (x,y) in the right image is the same as the middle disparity value of the pixel (x,y) in the left image, then the pixel (x,y) is considered to be located in an occluded region. If L(x,y) is used to represent a binary occlusion map (1 represents an occluded pixel, 0 represents an un-occluded pixel), then:

$$L(x, y) = \begin{cases} 1, & d'_0(\max(x - d_0(x, y), 1), y) \neq d_0(x, y) \\ 0, & \text{Others} \end{cases}$$

In order to fill the occluded regions, the method for stereo correspondence in accordance with an embodiment of the invention employs an edge-aware median filter. Process for filling the occluded regions is divided into two steps:

Step 1: for each occluded pixel, finding out the minimum disparity value of an un-occluded pixel closest to the occluded pixel in space in the same scanning line;

$$d_2(x, y) = \begin{cases} \min(d_{1l}(x, y), d_{1r}(x, y)), & \text{if } L(x, y) = 1 \\ d_1(x, y), & \text{if } L(x, y) = 0 \end{cases}$$

wherein:

$$d_{1l}(x, y) = d_1(\max\{x_i \mid 1 \leq x_i < x \text{ and } L(x_i, y) = 0\}, y);$$

$$d_{1r}(x, y) = d_1(\min\{x_i \mid x < x_i \leq w \text{ and } L(x_i, y) = 0\}, y).$$

Step 2: applying the two-pass 1D edge-aware median filter to these occluded pixels:

$$d_x(x, y) = \underset{x_1 \leq x_i \leq x_2}{\operatorname{median}}(d_2(x_i, y));$$

$$d(x, y) = \underset{y_1 \leq y_i \leq y_2}{\operatorname{median}}(d_x(x, y_i)).$$

That means a median of the horizontal window is set as a disparity value of the pixel firstly, and then a median of the vertical window is set as the final disparity value. Computations of the window size of each pixel are similar to the computations for cost aggregation.

Since the edge-aware support window employed by the method for stereo correspondence in accordance with an embodiment of the invention is more powerful than other cost aggregation methods (especially at boundaries), the method for stereo correspondence in accordance with an embodiment of the invention can produce very precise disparity maps.

Further, since the method for stereo correspondence in accordance with an embodiment of the invention has lower computation complexity, it is more efficient. Additionally, since all steps in the method for stereo correspondence in accordance with an embodiment of the invention use local operators, all these steps can be implemented in parallel. Furthermore, the method for stereo correspondence in accordance with an embodiment of the invention is able to fill occluded regions well.

Although the invention has been described with reference to detailed embodiments of the invention, those skilled in the art would understand that modifications, combinations and changes may be done to the detailed embodiments without departing from the scope and spirit of the invention as defined by the appended claims and the equivalents thereof.

Hardware or software may be used to perform the steps as needed. It should be noted that under the premise of not departing from the scope of the invention, the steps may be amended, added to or removed from the flow diagram provided by the description. Generally, a flow diagram is only one possible sequence of basic operations performing functions.

Embodiments of the invention may be implemented using a general programmable digital computer, a specific integrated circuit, programmable logic devices, a field-programmable gate array, and optical, chemical, biological, quantum or nano-engineering systems, components and institutions. Generally, functions of the invention may be realized by any means known to those skilled in the art. Distributed or networked systems, components and circuits may be used. Moreover, data may be transmitted wired, wirelessly, or by any other means.

It shall be realized that one or more elements illustrated in the accompanying drawings may be realized in a more separated or more integrated method; they would even be allowed to be removed or disabled under some conditions. Realizing programs or codes capable of being stored in machine readable media so as to enable a computer to perform the aforementioned method also falls within the spirit and scope of the invention.

Additionally, any arrows in the accompanying drawings shall be regarded as being exemplary rather than limiting. And unless otherwise indicated in detail, combinations of components and steps shall be regarded as being recorded when terms are foreseen as leading unclearity to the ability for separating or combining.

What is claimed is:

1. A method for stereo correspondence, comprising a matching cost computation, a cost aggregation, a disparity computation, and a disparity optimization, wherein the matching cost computation comprises:
  acquiring a left disparity space image and a right disparity space image by using horizontal gradients and vertical gradients of intensities of component channels of pixels in a left image and a right image, wherein:
  the cost aggregation comprises:
    as to any pixel (x,y) in a matching cost plane corresponding to any disparity value "d" in the left/right disparity space image, determining a scope of a cost aggregation support window for the pixel (x,y) by using horizontal gradients and vertical gradients of intensities of channels of multiple pixels around the pixel (x,y) in the left/right image through a gradient accumulation method;
    calculating an aggregation cost at the pixel (x,y) in the matching cost plane corresponding to the disparity value "d" by using matching costs of pixels in the scope of the cost aggregation support window for the pixel (x,y).

2. The method for stereo correspondence of claim 1, characterized in that for any pixel (x,y) in the left/right image, the disparity computation takes a disparity value corresponding to a minimum aggregation cost at the pixel (x,y) as a disparity value "$d_0$" of the pixel (x,y).

3. The method for stereo correspondence of claim 2, characterized in that the disparity optimization comprises:
  a sub-pixel optimization that estimates an optimized disparity value "$d_1$" of the pixel (x,y) by using the disparity value "$d_0$" of the pixel (x,y), two disparity values ($d_0-1$) and ($d_0+1$) adjacent to the disparity value "$d_0$", and matching costs respectively corresponding to the disparity values "$d_0$", ($d_0-1$), and ($d_0+1$) at the pixel (x,y) through quadratic polynomial interpolation.

4. The method for stereo correspondence of claim 2, characterized in that the disparity optimization comprises:
  an occlusion detection that finds an occluded region in a left/right optimized disparity image;
  an occlusion filling that constitutes an occlusion map using a smaller one of disparity values corresponding to occluded pixels and a disparity value of un-occluded pixels in the left optimized disparity image and the right optimized disparity image and performing median filtering for disparity values of pixels in the scope of the cost aggregation support window for the occluded region in the occlusion map by a median filter to acquire a final disparity value of occluded pixels.

5. A system for stereo correspondence, comprising:
  non-transitory computer readable storage medium to store program(s), and
  computer hardware configured, including configured by the program(s), to implement units comprising:
  a matching cost computation unit, a cost aggregation unit, a disparity computation unit, and a disparity optimization unit, wherein the matching cost computation unit is used to acquire a left disparity space image and a right disparity space image by using horizontal gradients and vertical gradients of intensities of all component channels of every pixel in a left image and a right image, wherein
  the cost aggregation unit comprises:
    a window acquisition that, as to any pixel (x,y) in a matching cost plane corresponding to any disparity value "d" in the left/right disparity space image, determines a scope of a cost aggregation support window for the pixel (x,y) by using horizontal gradients and vertical gradients of intensities of channels of multiple pixels around the pixel (x,y) in the left/right image through a gradient accumulation method;
    a cost aggregating that calculates an aggregation cost at the pixel (x,y) in the matching cost plane corresponding to the disparity value "d" by using matching costs of pixels in the scope of the cost aggregation support window for the pixel (x,y).

6. The system for stereo correspondence of claim 5, characterized in that for any pixel (x,y) in the left/right image, the disparity computation unit takes a disparity value corresponding to a minimum aggregation cost at the pixel (x,y) as a disparity value "$d_0$" of the pixel (x,y).

7. The system for stereo correspondence of claim 6, characterized in that the disparity optimization unit comprises:
  a sub-pixel optimization that estimates an optimized disparity value "$d_1$" of the pixel (x,y) by using the disparity value "$d_0$" of the pixel (x,y), two disparity values ($d_0-1$) and ($d_0+1$) adjacent to the disparity value "$d_0$", and matching costs respectively corresponding to the disparity values "$d_0$", ($d_0-1$), and ($d_0+1$) at the pixel (x,y) through quadratic polynomial interpolation.

8. The system for stereo correspondence of claim 6, characterized in that the disparity optimization unit comprises:
  an occlusion detection that finds an occluded region in a left/right optimized disparity image;
  an occlusion filling that constitutes an occlusion map using a smaller one of disparity values corresponding to occluded pixels and a disparity value of un-occluded pixels in the left optimized disparity image and the right optimized disparity image and performing median filtering for disparity values of pixels in the scope of the cost aggregation support window for the occluded region in the occlusion map by a median filter to acquire a final disparity value of occluded pixels.

* * * * *